Patented Feb. 16, 1932

1,845,821

UNITED STATES PATENT OFFICE

MAX JOSEPH THEUMANN, OF LYON, FRANCE, ASSIGNOR, BY MESNE ASSIGNMENTS, TO E. I. DU PONT DE NEMOURS AND COMPANY, OF WILMINGTON, DELAWARE, A CORPORATION OF DELAWARE

PREPARATION OF POWDERED PLASTIC MATERIAL

No Drawing. Application filed July 29, 1927, Serial No. 209,399, and in France August 3, 1926.

The moulding of plastic materials requires that these should be in the form of powder or small grains. This form renders the work easy and allows moulded articles of good quality to be obtained, whatever may be the moulding process employed.

A certain number of processes have been recommended for the preparation of powdered plastic materials the basis of which is a cellulosic ether or ester. A powdered cellulose ether or ester, or its mixtures with inert fillers, to which could be added substitutes for camphor, hereafter referred to as adjuvants, and small quantities of volatile matters, were first employed (French Patent 520,101 dated 9th July, 1920). The mixture could be moulded only under very high pressure, and at a temperature near that of the decomposition of the cellulose ether or ester. To avoid this drawback the patentee proposes to break up and powder the product of a first compression, the powder so obtained being moulded more easily than the first one. It has also been proposed (French Patent No. 569,642 dated 9th August, 1923) to triturate together the cellulose derivatives, the fillers and the adjuvants in presence of various solvents, so as to obtain a gelatinous homogeneous mass. The pasty mass obtained is heated under pressure and expelled through small apertures; by this operation it is obtained in a spongy state and may easily be powdered.

The object of the present invention is a process permitting the production directly, and without using complicated apparatus, in the form of a powder capable of being easily moulded, a plastic material the basis of which is a cellulose ether or ester. The word "powder" used in the present description is intended to mean a granulated physical form, the grains being more or less small according to the special method of moulding employed.

The process, according to the present invention, consists in incorporating in a solution of cellulose ether or ester the finely divided fillers and colouring matters and the adjuvants, in precipitating the cellulose ether or ester from this medium in the form of a powder, the adjuvants employed being substances insoluble in the precipitating agent, and in separating the pulverulent mass so obtained.

In carrying out the process, the cellulose ether or ester is precipitated in a granular form, the fineness of which is regulated by the method of precipitation. These grains surround the fillers and the adjuvants which are in this manner very uniformly distributed. The powder so formed is separated from the precipitating agent by the usual methods, for instance by filtration or decantation. The product is washed if desired, and dried.

The process herein described lends itself particularly to the manufacture of products with a basis of cellulose acetate. Cellulose acetate, as a matter of fact, is, at the end of its preparation, in solution in more or less diluted acetic acid. The utilization of this acetic solution in carrying out the invention permits the cellulose acetate manufacturer to obtain the desired plastic material in a very economical manner.

The process will be illustrated by the following examples which, it is understood, are by no means limitative.

I give hereunder examples of execution of the process.

*Example 1.*—100 grammes of cellulose acetate are dissolved in 660 grammes of acetone, and 30 grammes of ultramarine finely powdered and 7.5 grammes of ethyl-para-toluol-sulphamide are added to the solution with stirring. When the mixture is homogeneous, the cellulose acetate, containing the added materials, is precipitated by gradually adding 2,700 grammes of water. The product, precipitated in the form of a fine powder is filtered, washed and dried. It can be moulded without further treatment.

To this example, various modifications may be made. The quantity and the quality of the added materials, together with the adjuvants used, may be varied according to the colour and the hardness of the material sought. The added filling materials and the colour may also be formed in the solution according to the process described in the co-pending application of even date No. 209,398 for "process of coloration of cellulose esters and ethers". The material may also be coloured by means of organic colouring matters insoluble in the precipitating medium.

*Example 2.*—30 grammes of barium sulphate finely divided, 60 grammes of ethyl-paratoluol-sulphamide and 10 grammes of triphenyl-phosphate are introduced with stirring into 800 grammes of an acetylating acetic solution containing 100 grammes of cellulose acetate; when the mixture is homogeneous, the barium sulphate being uniformly distributed, 2.5 litres of water are added gradually with stirring. The acetate surrounding the added materials precipitates in the form of a powder the grain of which is more or less fine, depending on the stirring. The product is filtered, washed until neutral and dried. The powder obtained may be moulded without any other treatment. Modifications, similar to those mentioned with respect to Example 1, may be made in this example.

A particular process of precipitation consists in gradually distilling the solvent, while mixing or kneading in presence of a precipitating liquid which is not a solvent of the constituents of the plastic material, but which mixes with and is less volatile than the solvent in the conditions obtaining during the operation.

In carrying out this process, the cellulose ether or ester is first dissolved. Owing to the gradual distillation of the solvent, the medium in which this ether or ester is contained becomes gradually less good solvent and finally the cellulose ether or ester separates in the form of a powder containing in homogeneous distribution, the adjuvants and filling material which have been added initially. By pushing the distillation, the last traces of the solvent can be recovered, the plastic material, in the form of a powder, is then only in presence of the precipitating liquid, from which it can be separated by the usual methods, for example, by drying, or by continuing the distillation in the apparatus itself to eliminate the precipitating liquid.

The precipitating liquid may be added in various ways. Preferably it is added hot to the solution or paste, in such proportion that after its addition, the cellulose ether or ester is still dissolved in conditions proper for carrying out the operation, the distillation of the solvent being then begun at once.

The cellulose ether or ester may also be first dissolved, preferably with heating, in a suitable mixture of the solvent and of the precipitating liquid, while adding the plastifiers and the fillers if any, the distillation of the solvent being begun when the solution or paste is quite homogeneous.

Another procedure which is particularly useful for pasty solutions as they are used for the manufacture of celluloid, is to add gradually the precipitating agent while the distillation of the solvent is being performed. This method allows the apparatus to be used up to their full capacity.

Examples of the carrying out of this modification of the process are given hereafter.

*Example 3.*—1450 grammes of cellulose acetate are dissolved at approximately 50° C. in a mixing apparatus, in 1200 grammes of acetone. 625 grammes of plastifiers and then 900 grammes of finely powdered asbestos and 100 grammes of C. B. R. St. Denis black are added.

When the paste is homogeneous, 1500 grammes of water are gradually added, the temperature being maintained at 50° C. and stirring being continued. This addition completed, the temperature is raised and the acetone is distilled. When 1500 grammes of liquid have been distilled, and all the acetone employed has been recovered in this manner, the plastic material contained in the mixer is in the form of a powder. It can easily be withdrawn and dried. It is then ready for moulding.

*Example 4.*—1450 grammes of cellulose acetate are dissolved at approximately 50° C., in a mixing apparatus, in 2500 grammes of acetone and 1300 grammes of water. 625 grammes of plastifiers, 700 grammes of zinc oxide and 200 grammes of ultramarine are then added. When the mass is homogeneous, the temperature is raised and the acetone employed is distilled; it carries with it a small quantity of water. The plastic mass remaining in the mixer is in the form of a powder, which is dried.

*Example 5.*—2250 grammes of cellulose acetate, colored in the manner shown in Example 1, is dissolved in 1500 grammes of acetone and 750 grammes of plastifiers are added. When the mass is homogeneous, heat is applied so as to cause the distillation of the acetone. As the acetone distills, 1300 grammes of water are introduced gradually while stirring, this addition being done so that the quantity of liquid added is at any instant practically equal to the quantity of acetone distilled. When all the acetone used is recovered, the plastic mass contained in the mixer is in the form of a powder. After drying it can be used directly for moulding.

The above examples are given purely as indications as to how the invention may be carried out, the invention not being limited to the solvents, fillers or plastifiers mentioned, nor to the proportions used in the examples. The mass may be coloured as described in my co-pending applications; cellulose ethers or esters, other than cellulose acetate, can also be utilized in a similar manner, on condition of using for each of them suitable solvents and precipitating agents together with suitable adjuvants.

What I claim and desire to secure by Letters Patent is:—

1. The process of preparing powdered plastic materials the base of which is a cellulose derivative, which comprises forming a solution of a cellulose derivative, adding finely divided fillers and adjuvants to said solution, adding to the mass a precipitating agent in which said adjuvants are insoluble and separating the resulting powdered material.

2. The process of preparing powdered plastic materials the base of which is a cellulose ester, which comprises forming a solution of a cellulose ester, adding finely divided fillers and adjuvants to said solution, adding to the mass a precipitating agent in which said adjuvants are insoluble and separating the resulting powdered material.

3. The process of preparing powdered plastic materials the base of which is cellulose acetate, which comprises forming a solution of cellulose acetate, adding thereto finely divided fillers and adjuvants, adding to the mass a precipitating agent in which said adjuvants are insoluble and separating the resulting powdered material.

4. The process of preparing powdered plastic materials the base of which is a cellulose derivative, which comprises forming an acetylating acetic solution of a cellulose derivative, homogeneously distributing finely divided fillers and adjuvants in said solution, adding to the mass a precipitating agent in which said adjuvants are insoluble and separating the resultant powdered material.

5. The process of preparing powdered plastic materials the base of which is a cellulose derivative, which comprises forming a solution of a cellulose derivative, adding thereto finely divided fillers and adjuvants, adding to the mass a precipitating liquid miscible with and less volatile than the solvent and in which liquid the plastic material is insoluble, distilling said solvent thereby to assist precipitation of the plastic material and separating the resulting powdered material.

6. The process of preparing powdered plastic materials the base of which is a cellulose derivative, which comprises forming a solution of a cellulose derivative, adding thereto finely divided fillers and adjuvants, adding to the mass while in a pasty condition a precipitating liquid miscible with and less volatile than the solvent and in which liquid the plastic material is insoluble, distilling said solvent thereby to assist precipitation of the plastic material and separating the resulting powdered material.

In testimony whereof I have signed my name to this specification.

MAX JOSEPH THEUMANN.